(12) United States Patent
Messerly et al.

(10) Patent No.: US 7,907,810 B2
(45) Date of Patent: Mar. 15, 2011

(54) OPTICAL FIBER HAVING WAVE-GUIDING RINGS

(75) Inventors: Michael J. Messerly, Danville, CA (US); Jay W. Dawson, Livermore, CA (US); Raymond J. Beach, Livermore, CA (US); Christopher P. J. Barty, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 632 days.

(21) Appl. No.: 11/809,112

(22) Filed: May 30, 2007

(65) Prior Publication Data
US 2008/0260338 A1    Oct. 23, 2008

Related U.S. Application Data

(60) Provisional application No. 60/810,116, filed on May 31, 2006.

(51) Int. Cl.
*G02B 6/02* (2006.01)
(52) U.S. Cl. ........ 385/127; 365/123; 365/124; 365/125; 365/126; 365/128
(58) Field of Classification Search .................. 385/123, 385/124, 125, 126, 127, 128
See application file for complete search history.

(56) References Cited

U.S. PATENT DOCUMENTS

| | | | |
|---|---|---|---|
| 4,149,772 A | 4/1979 | Iyengar et al. | |
| 4,212,660 A | 7/1980 | Maurer | |
| 4,755,021 A | 7/1988 | Dyott | |
| 5,675,690 A | 10/1997 | Nouchi et al. | |
| 5,761,366 A | 6/1998 | Oh et al. | |
| 5,999,679 A | 12/1999 | Antos et al. | |
| 6,519,403 B1 | 2/2003 | Hirano et al. | |
| 6,650,663 B1 | 11/2003 | Diening et al. | |
| 6,816,652 B1 * | 11/2004 | Lin et al. | 385/39 |
| 7,050,474 B2 * | 5/2006 | Shan et al. | 372/70 |
| 2002/0061177 A1 | 5/2002 | Jeon et al. | |
| 2003/0089133 A1 | 5/2003 | Caplen et al. | |

FOREIGN PATENT DOCUMENTS
WO    WO 02/079829    10/2002

* cited by examiner

Primary Examiner — Jennifer Doan
(74) Attorney, Agent, or Firm — John P. Wooldridge

(57) ABSTRACT

A waveguide includes a cladding region that has a refractive index that is substantially uniform and surrounds a wave-guiding region that has an average index that is close to the index of the cladding. The wave-guiding region also contains a thin ring or series of rings that have an index or indices that differ significantly from the index of the cladding. The ring or rings enable the structure to guide light.

23 Claims, 1 Drawing Sheet

OPTICAL FIBER HAVING WAVE-GUIDING RINGS

This application claims priority to U.S. Provisional Patent Application Ser. No. 60/810,116, titled: "Optical fiber having wave-guiding rings, and method of making same", filed May 31, 2006 and incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to fiber optics, and more specifically, it relates to fiber optics that tailor the shape of a guided mode.

2. Description of Related Art

Conventional types of fiber optics that are used when a shaped optical mode is desirable include (i) large mode area fibers, (ii) large flat mode fibers, (iii) photonic-crystal fibers and (iv) Bragg fibers.

In large mode area (LMA) fibers, the refractive index profile is generally a single step, and the index difference between the core and cladding is made as small as manufacturing tolerances allow. The diameter of the fiber's core region is made large by telecommunications standards—generally greater than 20 μm. The large core allows the mode to spread over a large area, which is beneficial. Unfortunately, it also allows the fiber to guide many modes, and these degrade the shape of the guided beam. To mitigate the latter effect, end-users generally eliminate higher-order modes by bending the fiber. This works only to a point, though; as the core is made larger and larger, the fiber propagates more and more modes, and it becomes progressively more difficult to distinguish the desired mode from the growing number of undesired modes.

Large flat mode fibers are similar to LMA fibers, except that a ring of higher index glass is added at the outer edge of a step-like core. If properly designed and fabricated, the ring can stretch the mode from a bell-like shape to one having a rectangular-like shape. For a given number of guided modes, the rectangular shape reduces the peak field intensity in the fiber and thus reduces the threshold for nonlinear artifacts. Unfortunately, no such fiber has yet been successfully fabricated. Attempts have generally been limited by manufacturing tolerances; the limiting constraint now appears to be fluctuations in the refractive index of the step-like core that are on the order of $10^{-4}$.

In photonic-crystal fibers, also known as microstructured fibers, photonic bandgap fibers, and holey fibers, the effective index of the core, cladding, or both is tailored by changing the size and distribution of periodically placed holes within the fiber's structure. The manufacturing tolerances of these fibers allow for larger guided mode areas than can be reliably produced by more common manufacturing techniques, but unfortunately the fibers are today relatively fragile and expensive. Moreover, we are not aware of any designs to flatten the shape of the guided mode by this technique.

Bragg fibers date back to the late 1970's (Yeh, Yariv, and Moram), with more recent work by B. Temelkuran, Y. Fink, and coworkers in the late 1990's and early 2000's. Such fibers are not widely available, perhaps because their structures are much more complex than the others described here. Moreover, designs to flatten the shape of the guided mode in Bragg fibers are not known.

SUMMARY OF THE INVENTION

It is an object of the present invention to provide waveguides that tailors the shape of a guided mode.

Another object of the invention is to tune the effective cross-sectional area of a waveguide.

Still another object is to reduce the susceptibility of a waveguide to losses that stem from misalignments.

Another object is to provide a method of manufacturing a waveguide that propagates only a single transverse mode.

These and other objects will be apparent based on the disclosure herein.

The optical fiber of the present invention offers several advantages for high-energy and telecommunications applications. One embodiment of the structure includes a cladding region, whose refractive index is substantially uniform and a wave-guiding region, which is surrounded by the cladding and whose average index is close to that of the cladding. An attribute of this region is that it also contains a thin ring or series of rings whose index or indices differ significantly from that of the cladding. The ring or rings enable the structure to guide light.

A precursor preform for such a fiber waveguide can be fabricated by depositing a thin layer of glass with an appropriately modified refractive index structure onto the inside of a silica tube. The tube is then heated to its melting temperature, and collapsed onto the outside of a silica rod. The process can be repeated—that is, additional tubes can be melted over the first rod/tube combination.

An advantage of this fabrication method is that the greater portion of the waveguide consists of pre-fabricated silica glass, which can be less expensive and more uniform than deposited glass. The refractive index structure of the thin deposited layer can be measured prior to the melting step, so that a faulty layer can be identified and discarded before incurring additional expenses.

This type of waveguide structure can be used to transport or amplify high-energy pulses of light. The large effective area of the shaped guided mode make it attractive for both, since it reduces the threshold for catastrophic damage and the nonlinear defects that come into play as this threshold is approached.

Specific applications include amplifiers for the National Ignition Facility (NIF) and for Thompson scattering systems, both of which would benefit from fibers that can create and transport nanosecond-scale millijoule-level pulses of light without distortion.

If the fiber transports only a single transverse mode, then it may also be used as the gain element of a mode-locked oscillator. The peak power density can be reduced by a large factor (perhaps a factor of 10). Thus, the threshold pulse energy can be raised by the same factor.

Specific commercial applications include long-distance telecommunications, which would benefit from the reduction in nonlinear distortions—although the power levels in telecommunications are modest compared to those sought for use in the NIF, their distances are much, much greater. Short-distance telecommunications would benefit from the fiber's reduced susceptibility to losses that stem from misalignments.

The reduced nonlinear artifacts of this type of fiber would also increase the quantity of visible light that can be created via nonlinear frequency-conversion, possibly making the fibers a key component in future display technologies. Single-mode versions of the fibers described here might also be used to make high-energy, fiber-based mode-locked oscillators.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Embodiments of the present invention include an optical fiber design that offers several advantages for high-energy and telecommunications applications. One such structure consists of a cladding region, whose refractive index is substantially uniform and a wave-guiding region, which is surrounded by the cladding and whose average index is close to that of the cladding. A key attribute of this region is that it also contains a thin ring or series of rings whose index or indices differ significantly from that of the cladding. The ring or rings enable the structure to guide light. This waveguide provides the ability to tailor the shape of a guided mode to tune its effective cross-sectional area and to reduce its susceptibility to losses that stem from misalignments. This design allows the ability to manufacture a waveguide that propagates only a single transverse mode.

Figure 1:
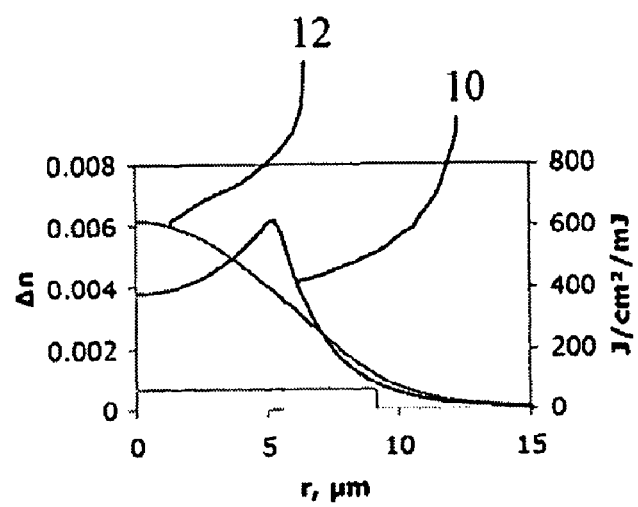
FIG. 1 compares two fiber designs—one is a ring-like design of this invention and the other is a conventional step-index design.

FIG. 1 compares two fiber designs—one is a ring-like design of this invention (10) and the other is a conventional step-index design (12). Both propagate only one transverse mode at 1050 nm, and their peak field intensities are the same. Note, though, that the conventional design requires control over the refractive index down to $7 \times 10^{-4}$, which is not currently achievable. In contrast, the ring-like design takes advantage of the good index control and uniformity of the central silica rod, and only requires modest control of the thickness and index of the ring structure. Table 1 below provides the details of the fiber structure shown in FIG. 1. Center wavelength for this example is 1053 nm. The materials used are pure silica ($SiO_2$), or silica doped with elements that are known to modify its refractive index. For example, Ge and F are known by those skilled in the art to raise or lower the refractive index by amounts appropriate to achieve the above refractive index differences. The tolerances on radii are 0.01 µm. The tolerance on refractive indices is $1 \times 10^{-4}$.

TABLE 1

| outer bound radius (µm) | Δn |
| --- | --- |
| 5.03 | 0 |
| 5.59 | 0.00672 |
| 50 | 0 |

Figure 2:
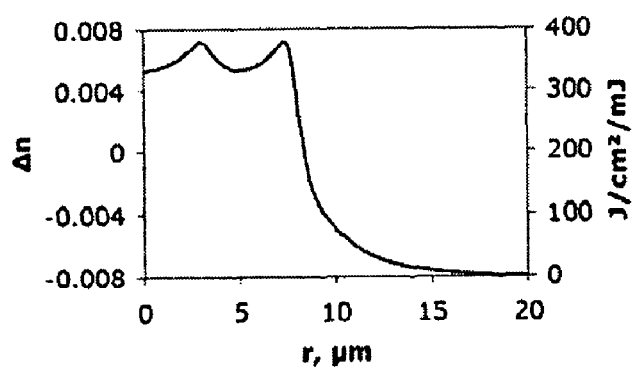
FIG. 2 shows a fiber design having an outer index depression to better confine the tail of the mode, and an interior ring to make the intensity more uniform across the core.

FIG. 2 shows an alternative design. This fiber propagates only one transverse mode at 1050 nm. However, it has the added benefit of an outer index depression (to better confine the tail of the mode) and an interior ring (to make the intensity more uniform across the core). Such a fiber can also be manufactured by the technique described here, requiring two collapsing steps (though there are three rings, two are adjacent and can thus be deposited on the inside of a single tube). Table 2 below provides the outer bound radii and index of refraction changes for the example of FIG. 2. The center wavelength for this example is 1053 nm. The materials used are pure silica ($SiO_2$), or silica doped with elements that are known to modify its refractive index. The tolerances on radii are 0.01 µm. The tolerance on refractive indices is $1 \times 10^{-4}$.

TABLE 2

| Outer bound radius (µm) | Δn |
| --- | --- |
| 2.91 | 0 |
| 3.23 | 0.00369 |
| 7.27 | 0 |
| 8.08 | 0.00672 |
| 9.21 | −0.00336 |
| 50 | 0 |

Figures 3A, 3B, 3C:
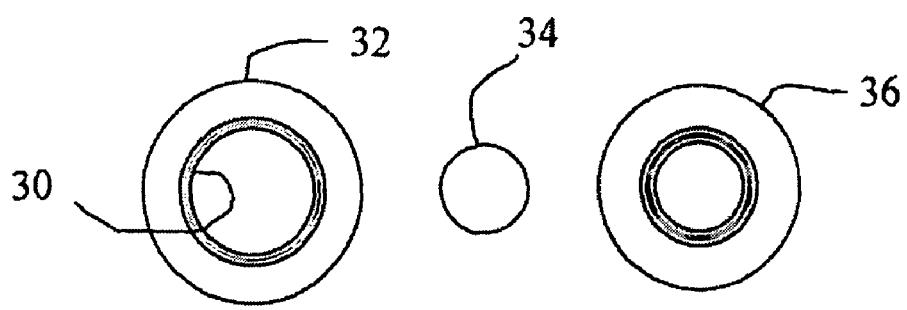
FIGS. 3A-3C illustrate a technique for manufacturing precursor preforms for exemplary fibers of the present invention.

FIGS. 3A-3C show a technique for manufacturing precursor preforms for these types of fibers. FIG. 3A shows a ring 30 or rings of materials deposited on the interior of a hollow silica (or doped silica) tube 32 using the modified chemical vapor deposition (MCVD) method. After inspection, this tube of combined rings 30 and 32 is collapsed over a solid rod 34 of either pure silica or silica doped with materials that alter its optical properties (such as Ge, F, or rare-earth elements). The resulting perform 36, shown in FIG. 3C, can be drawn into fiber via conventional methods.

The process can be repeated to make more complex waveguide structures such as the one described in the previous paragraph. The process can also be reversed—that is, if a manufacturer prefers outside vapor deposition (OVD) to MCVD, then he would deposit the ring structures on the outside of rods, rather than on the inside of tubes.

The above schemes also allow for the design and manufacture of fibers that propagate multiple transverse modes. Though multiple modes can lead to problems for some applications, they are sometimes unavoidable and acceptable for other applications.

An exemplary design strategy for embodiments of the present invention begins by selecting a core of material having a refractive index that is as homogenous and as close to that of pure silica as possible. The closer the core's index is to silica, the larger the mode size that can be guided. The index of the core material can be determined by measurement and then choose the index and thickness of the ring or rings to are selected to create an appropriate guiding structure for the desired mode size and wavelength. The key here is that the core material cannot (and should not) guide the mode on its own. Instead, the ring or rings provide the guiding impetus. Refractive index variations should typically be held to less than one-half the average refractive index of the core and one-tenth the average refractive index of the cladding region. Let λ represent the wavelength of the light to be guided, and let D and n respectively represent the diameter and mean refractive index of the core region. Then for the refractive indices of the core and cladding to be considered "close" or "nearly the same," their difference, Δn, should be less than $\Delta n < (\lambda/D)^2/(8n)$. For example, if the wavelength to be guided is 1 µm, the core diameter is 50 µm, and the mean index of the core is 1.5, then the core and cladding refractive indices are close if their difference is less than $3.3 \times 10^{-5}$.

Accordingly, an embodiment of the present invention includes fiber optics, methods for making fiber optics and methods for operating fiber optics. An exemplary optical fiber according to the present invention comprises a core comprising a first index of refraction (N), a concentric ring embedded within said core, wherein said concentric ring comprises a second N, and a cladding surrounding said core, wherein said cladding comprises a third N. The fiber optic may include a second concentric ring embedded within said core, wherein said second concentric ring comprises said second N. The fiber optic may include a second concentric ring embedded within said core, wherein said second concentric ring comprises a fourth N. The second N may be greater than or less than said first N. The third N may be less than said first N. The concentric ring can comprise less than 10% of the cross-section of said core.

Another exemplary embodiment is a fiber optic, comprising a core comprising at least one embedded region, wherein said comprises a first region comprising a first index of refraction, wherein said at least one embedded region comprises a second index of refraction and a cladding region surrounding said wave-guiding region, wherein said cladding region comprises a third index of refraction, wherein an average of said first index of refraction and said second index of refraction is about equal to said third index of refraction. The may be a difference between said third index of refraction and said average of said first index of refraction and said second index of refraction is less than $(\lambda/D)^2/(8n)$, where $\lambda$ is the wavelength of light to be guided by said wave-guiding region, D is the diameter of said wave-guiding region and n is the mean refractive index of said wave-guiding region. Also a difference may exist between said second index of refraction and said third index of refraction is greater than $(\lambda/D)^2/(8n)$. The core can have a refractive index variation that is less than one-half said average index of refraction. The cladding can have a refractive index variation that is less than one-tenth the average of said second index of refraction, wherein said cladding comprises a refractive index variation that is less than one-tenth the average of said third index of refraction. The embedded region can have a plurality of embedded regions and can include, e.g., an outer embedded region and an inner embedded region, wherein said outer embedded region is closer is proximity to said cladding region than said inner embedded region. The inner embedded region can comprise an index of refraction that is less than the index of refraction of said outer embedded region. The inner embedded region can comprise an index of refraction that is greater than said third index of refraction. The embedded region may comprise a reduced index of refraction region comprising an index of refraction that is less than said average first index of refraction. The reduced index of refraction region is located between said outer embedded region and said cladding. The core may comprise a laser gain media dopant. The fiber optic may include an optical pumping mechanism configured to optically pump said laser gain media dopant to produce a population inversion. The system may further comprise a laser system configured to propagate a seed beam in said core, wherein said seed beam will interact with said population inversion to produce an output laser beam.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A fiber optic, comprising:
a core comprising at least one embedded region, wherein said core comprises a first region comprising a first index of refraction, wherein said at least one embedded region comprises a second index of refraction, wherein said core comprises a laser gain media dopant;
an optical pumping mechanism configured to optically pump said laser gain media dopant to produce a population inversion;
a laser system configured to propagate a seed beam in said core, wherein said seed beam will interact with said population inversion to produce an output laser beam; and
a cladding region surrounding said wave-guiding region, wherein said cladding region comprises a third index of refraction, wherein an average of said first index of refraction and said second index of refraction is about equal to said third index of refraction.

2. A fiber optic, comprising:
a core comprising at least one embedded region, wherein said core comprises a first region comprising a first index of refraction, wherein said at least one embedded region comprises a second index of refraction; and
a cladding region surrounding said wave-guiding region, wherein said cladding region comprises a third index of refraction, wherein an average of said first index of refraction and said second index of refraction is about equal to said third index of refraction, wherein a difference between said third index of refraction and said average of said first index of refraction and said second index of refraction is less than $(\lambda/D)^2/(8n)$, where $\lambda$ is the wavelength of light to be guided by said wave-guiding region, D is the diameter of said wave-guiding region and n is the mean refractive index of said wave-guiding region.

3. The fiber optic of claim 2, wherein a difference between said second index of refraction and said third index of refraction is greater than $(\lambda/D)^2/(8n)$.

4. The fiber optic of claim 1, wherein said core comprises a refractive index variation that is less than one-half said average index of refraction.

5. The fiber optic of claim 2, wherein said cladding comprises a refractive index variation that is less than one-tenth the average of said second index of refraction.

6. The fiber optic of claim 4, wherein said cladding comprises a refractive index variation that is less than one-tenth the average of said third index of refraction.

7. The fiber optic of claim 1, wherein said at least one embedded region comprises a plurality of embedded regions.

8. The fiber optic of claim 1, wherein said at least one embedded region comprises an outer embedded region and an inner embedded region, wherein said outer embedded region is closer is proximity to said cladding region than said inner embedded region.

9. The fiber optic of claim 8, wherein said inner embedded region comprises an index of refraction that is less than the index of refraction of said outer embedded region.

10. The fiber optic of claim 9, wherein said inner embedded region comprises an index of refraction that is greater than said third index of refraction.

11. The fiber optic of claim 10, wherein said at least one embedded region comprises a reduced index of refraction region comprising an index of refraction that is less than said average first index of refraction.

12. The fiber optic of claim 11, wherein said reduced index of refraction region is located between said outer embedded region and said cladding.

13. The fiber optic of claim 2, wherein said core comprises a refractive index variation that is less than one-half said average index of refraction.

14. The fiber optic of claim 13, wherein said cladding comprises a refractive index variation that is less than one-tenth the average of said third index of refraction.

15. The fiber optic of claim 2, wherein said at least one embedded region comprises a plurality of embedded regions.

16. The fiber optic of claim 2, wherein said at least one embedded region comprises an outer embedded region and an inner embedded region, wherein said outer embedded region is closer is proximity to said cladding region than said inner embedded region.

17. The fiber optic of claim 16, wherein said inner embedded region comprises an index of refraction that is less than the index of refraction of said outer embedded region.

18. The fiber optic of claim 17, wherein said inner embedded region comprises an index of refraction that is greater than said third index of refraction.

19. The fiber optic of claim 18, wherein said at least one embedded region comprises a reduced index of refraction region comprising an index of refraction that is less than said average first index of refraction.

20. The fiber optic of claim 19, wherein said reduced index of refraction region is located between said outer embedded region and said cladding.

21. The fiber optic of claim 2, wherein said core comprises a laser gain media dopant.

22. The fiber optic of claim 21, further comprising an optical pumping mechanism configured to optically pump said laser gain media dopant to produce a population inversion.

23. The fiber optic of claim 22, further comprising a laser system configured to propagate a seed beam in said core, wherein said seed beam will interact with said population inversion to produce an output laser beam.

* * * * *